(12) United States Patent
Prashanth et al.

(10) Patent No.: US 12,730,835 B1
(45) Date of Patent: Sep. 8, 2026

(54) EFFICIENT DETERMINATION OF QUANTITATIVE SUPPLY CHAIN INFORMATION

(71) Applicant: Auger Inc., Bellevue, WA (US)

(72) Inventors: Gopi Prashanth, Redmond, WA (US); Izzy Doctor, Bellevue, WA (US); Russell Allgor, Seattle, WA (US); Mohit Sinha, Lynnwood, WA (US)

(73) Assignee: Auger Inc., Bellevue, WA (US)

( * ) Notice: Subject to any disclaimer, the term of this patent is extended or adjusted under 35 U.S.C. 154(b) by 0 days.

(21) Appl. No.: 19/301,356

(22) Filed: Aug. 15, 2025

(51) Int. Cl.
*G06F 16/36* (2019.01)
*G06F 16/25* (2019.01)

(52) U.S. Cl.
CPC .......... *G06F 16/367* (2019.01); *G06F 16/254* (2019.01)

(58) Field of Classification Search
CPC ............................ G06F 16/367; G06F 16/254
See application file for complete search history.

(56) References Cited

U.S. PATENT DOCUMENTS 12,380,146 B1 * 8/2025 Ramaswamy .......... H04L 51/04
2022/0043826 A1 * 2/2022 Zorin ................ G06F 16/24573
2025/0078011 A1 * 3/2025 Sahoo ................ G06Q 30/0201
2025/0147976 A1 * 5/2025 Mukherjee ............ G06F 16/254

* cited by examiner

*Primary Examiner* — Daniel C Washburn
*Assistant Examiner* — Penny L Caudle
(74) *Attorney, Agent, or Firm* — Seed Intellectual Property Law Group LLP

(57) ABSTRACT

An extract-transform-load ("ETL") pipeline configured to act on dynamic supply chain data for a subject organization is described. The pipeline is made up of (1) a number of ETL transform nodes, and (2) a number of tables. Tables in a first group are each established to be populated by one of the ETL transform nodes based upon content of one or more feeder tables of the ETL transform node. A distinguished one of the ETL transform nodes specifies an insight mechanism to be invoked by the distinguished ETL transform node with contents of the distinguished ETL transform node's one or more feeder tables to populate the corresponding table with a derived insight result. When the distinguished ETL transform node operates within the ETL pipeline, the specified insight mechanism can be invoked to populate the table established to be populated by the distinguished ETL transform node.

16 Claims, 14 Drawing Sheets

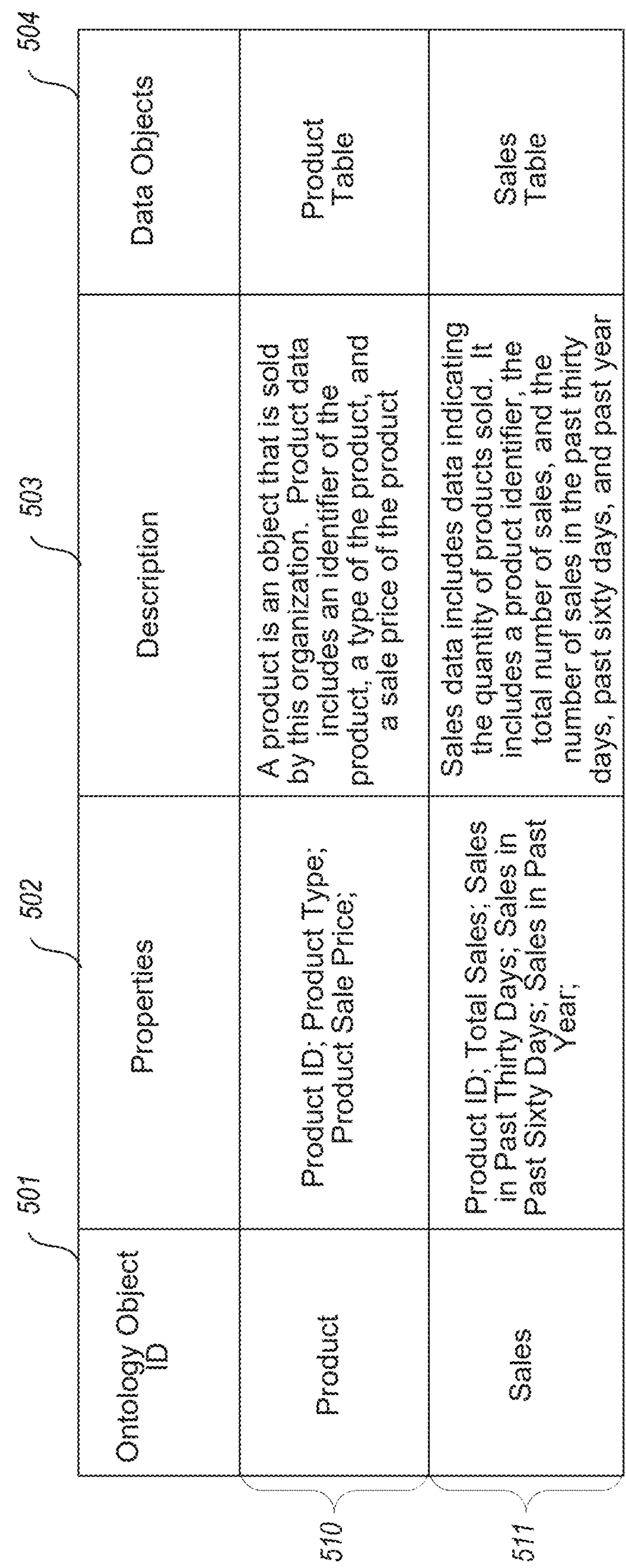

500

| | Ontology Object ID (501) | Properties (502) | Description (503) | Data Objects (504) |
|---|---|---|---|---|
| 510 | Product | Product ID; Product Type; Product Sale Price; | A product is an object that is sold by this organization. Product data includes an identifier of the product, a type of the product, and a sale price of the product | Product Table |
| 511 | Sales | Product ID; Total Sales; Sales in Past Thirty Days; Sales in Past Sixty Days; Sales in Past Year; | Sales data includes data indicating the quantity of products sold. It includes a product identifier, the total number of sales, and the number of sales in the past thirty days, past sixty days, and past year | Sales Table |

*FIG. 5*

| Product ID | 30-Day Forecast | 60-Day Forecast |
|---|---|---|
| 123 | 100 sales | 300 sales |
| 456 | 200 sales | 250 sales |
| 789 | 50 sales | 100 sales |

EFFICIENT DETERMINATION OF QUANTITATIVE SUPPLY CHAIN INFORMATION

BACKGROUND

Supply chains encompass the reception, storage, processing, and distribution of goods. An organization may generate and store data regarding the goods in the supply chain at each stage in the supply chain. Such data may indicate: different types of goods associated with the organization; where goods are to be distributed, stored, received, sold, etc.; sales of goods; when goods are to be distributed, stored, received, etc.; entities that store, distribute, receive, sell, etc., goods; conditions of one or more regions where goods are to be distributed, stored, received, sold, etc.; and how goods are to be distributed, stored, received, sold, etc.

BRIEF DESCRIPTION OF THE DRAWINGS

FIG. 5 is a table diagram of a sample data object data table, used by the facility in some embodiments.

DETAILED DESCRIPTION

Figure 1:
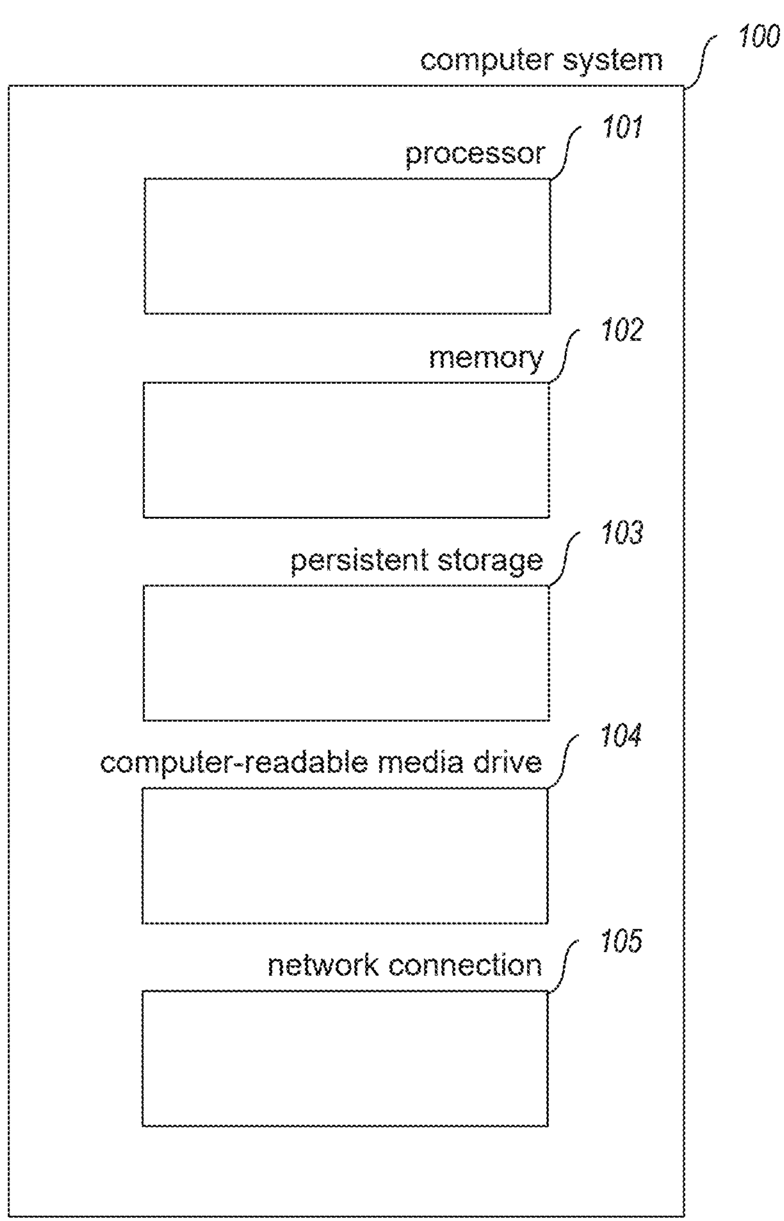
FIG. 1 is a block diagram showing some of the components typically incorporated in at least some of the computer systems and other devices on which the facility operates.

The inventor has recognized a variety of disadvantages of current approaches to supply chain analysis. First, supply chain analysis relies upon supply chain data scientists, who are highly-trained to be very familiar with the details of the operation of the subject organization's supply chain to manually review, access, and analyze supply chain data. However, the amount of supply chain data for an organization may be on the order of hundreds of gigabytes, terabytes, etc., and is too voluminous for a supply chain data scientist to practically understand to create insights or reasonings about a supply chain. Furthermore, supply chain issues that rely on analysis of supply chain data often must be resolved quickly, beyond the rate of working of supply chain data scientists. Supply chain data scientists are also scarce, expensive, and difficult to train, and obtaining enough new supply chain analysts to understand and resolve supply chain issues is often impractical. Because of the volume of data and scarcity of supply chain data scientists, this manual process requires an impractical amount of time being spent to resolve or answer supply chain issues and questions. Additionally, conventional approaches to supply chain analysis relies on supply chain data scientists to learn and understand the operational processes and contents of the data in order to perform their analysis for each organization for which they analyze supply chain data.

In response to recognizing these disadvantages, the inventors have conceived and reduced to practice a software and/or hardware facility for performing automatic reasoning regarding raw supply chain data for a subject organization ("the facility"). The facility automates the work of a supply chain data scientist working within a subject organization. The facility represents the subject organization's supply chain and how it operates by creating an institutional information object where this information is expressed in natural language. The facility represents the organization's raw supply chain data by creating for each data object an ontology object that serves as a guide to automatically using the data object, describing the contents of the data object and their significance in natural language. The facility represents external data access tools to access external data feeds by creating for each a tool object that serves as a guide to its automatic use, describing the tool and how to use it to retrieve particular external data in natural language. The facility represents an understanding of the supply chain domain by training a foundational model, such as a large language model ("LLM"), specialized to understand the supply chain domain, including its concepts, processes, terminology, data organization, etc., using relevant training materials such as textbooks, course guides, academic papers, etc. The natural language description of each of the resources, using typical supply chain terminology, serves as an interface for the specialized foundational model to understand and appropriately use them in responding to user prompts.

An agent provided by the facility receives user prompts that each seek particular information about the state of the subject company's supply chain, such as from a supply chain analyst that does not need to be a data scientist. The facility augments each user prompt by using the ontology objects, the institutional information, and the tool objects, and submits the augmented prompt to the specialized foundational model to generate a response. By assessing the natural language contents of the user prompt against the natural language descriptions of these resources, the foundational model accesses contents of the appropriate data objects underlying the ontology objects, and uses its understanding of the supply chain domain to analyze and process those data object contents in the context of the institutional information and external information accessed via the tools to produce a response to the query. In some embodiments, the top-level agent responsible for handling user prompts in turn calls lower level "subagents" that perform more specialized actions with respect to some or all of the resources. For example, the top-level agent may receive a prompt requesting sales forecasts for a plurality of regions. In this example, the top-level agent may call one or more subagents to generate sales forecasts for each of the plurality of regions, and then cause a response to the prompt to be generated based on the forecasts generated by each of the one or more subagents.

In some embodiments, an ontology object indicates a data object and includes a natural language text description of the data object, including: one or more properties of the data object; a description of the type of supply chain data the data object represents; or other data regarding the data object. In some embodiments, a natural language text description of an institutional information object describes one or more operational processes of an organization, such as of the organization's supply chain processes. In some embodiments, the facility receives the natural language text descriptions of the data objects, institutional information objects, tool objects, or some combination thereof, via user input.

In some embodiments, the facility uses a general-purpose foundational model, such as, for example, GPT, Llama, Grok, or other generalized foundational models. In some embodiments, the facility performs supplemental training of the general-purpose foundational model to create a specialized foundational model. In some embodiments, the facility trains the specialized foundational model from scratch. In some embodiments, the facility uses training data including data associated with supply chains to create or train the specialized foundational model. For example, the training data may include data received from one or more data sources associated with supply chains, such as textbooks, forums, scientific papers, blog posts, laws, regulations, other data associated with supply chains, or some combination thereof. In some embodiments, the training data is annotated based on the terminology, operations, optimizations, formulae, rules, laws, restrictions, other annotations of data regarding a field of use, or some combination thereof, before being used to train the foundational model. In some embodiments, the training data includes data indicating one or more categories of tasks associated with one or more types of annotated data. In such embodiments, the foundational model is thus trained to generate a response based on data associated with a category of task indicated by a prompt.

By performing in some or all of the ways described above, the facility is able to enable conventional supply chain data systems to be used to automatically generate reasoning and insights, such as in response to a prompt. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by specializing a foundational model to generate responses to prompts regarding a supply chain of a subject organization, the generated response is more accurate in the first instance, and a user does not need to provide additional prompts to the foundational model to clarify, improve, or adjust the generated response. By reducing the number of additional prompts received by the foundational model, computing resources, such as processor cycles, memory, etc., used by the foundational model to generate responses is reduced.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc. For example, an organization may generate tens of gigabytes of supply chain data per day, which would be too voluminous for a single supply chain data scientist to practically understand, apply to other supply chain data on the order of hundreds of gigabytes, and create insights or reasonings in order to resolve supply chain issues that rely on analysis of supply chain data. In another example, if a different organization had a supply chain issue, the supply chain analysist would be unable to perform the same process for the different organization without first taking time to understand tens to hundreds of gigabytes of supply chain data for the different organization, thus making it impractical for a single supply chain data scientist to create reasoning and insights for multiple different entities.

The inventors have also recognized significant disadvantages in conventional approaches to determining data derived from raw data received via extract-transform-load ("ETL") processes, such as a subject organization's supply chain data. In particular, to conventionally determine a sales forecast from historical sales data, in response to such a forecast being requested, a forecasting algorithm is called against a table into which a latest version of the subject organization's historical sales data has been loaded in the last ETL cycle. The forecasting algorithm returns the forecast, which is used to respond to the request. The inventors have recognized disadvantages including the following of the conventional approach: It creates meaningful latency in responding to the request, as the forecasting algorithm doesn't begin executing until the request is received. Any subsequent request must be satisfied by repeating this process, again incurring the processing resources and latency. It also must be designed, implemented, tested, and maintained in an explicit way by a rare and expensive supply chain data scientist.

In response, the inventors have extended the facility to in some embodiments include ontology objects for derived insights. Such a derived insight ontology object describes in natural language a derived insight result-such as contents of a derived insight result table, allowing the derived insight result to be accessed and used by the facility in responding to prompts. By representing the derived insight as an ontology object, the facility enables its general mechanism of discovering the derived insights existence, meaning, content, and use to apply side-by-side with other ontology-qualified data, accessing, connecting, and analyzing it in ways that respond to user prompts and other needs for supply chain data.

The facility recurringly generates the derived insight result table by including in the ETL pipeline for the subject organization's supply chain data an ETL transform that receives data from upstream "feeder" tables and invokes an insight mechanism for generating the derived insight from data in the feeder tables. In various embodiments, the insight mechanism is a procedural analytical algorithm, or a prompt used to invoke a generative model, such an LLM specialized to the supply chain domain. When an activation trigger for the ETL transform occurs, the ETL transform invokes the insight mechanism, passing contents of the feeder tables, and receives the results to store in the derived insight result table for use in processing subsequent prompts received by the facility. In various embodiments, the facility assigns various types of activation triggers to the ETL transform, including modification of a feeder table, the elapse of a recurring refresh period, etc.

By performing in some or all of the additional ways described above, the facility makes up to the content of the derived insight immediately available for use in responding prompts that implicate it, without having to incur the latency of determining the derived insight in response to any of these prompts. Further, the facility saves the unnecessary processing resources that would have been used to recalculate the derived insight for multiple prompts received since the underlying data last changed, thus improving the functioning of computer or other hardware. All of this can occur without relying on a supply chain data scientist familiar with the subject organization to design, implement, test, and maintain the process for determining the derived insight.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components shown in FIG. 1 and discussed above constitutes a data signal per se. While computer systems configured as described above are typically used to support the operation of the facility, those skilled in the art will appreciate that the facility may be implemented using devices of various types and configurations, and having various components.

Figure 2:
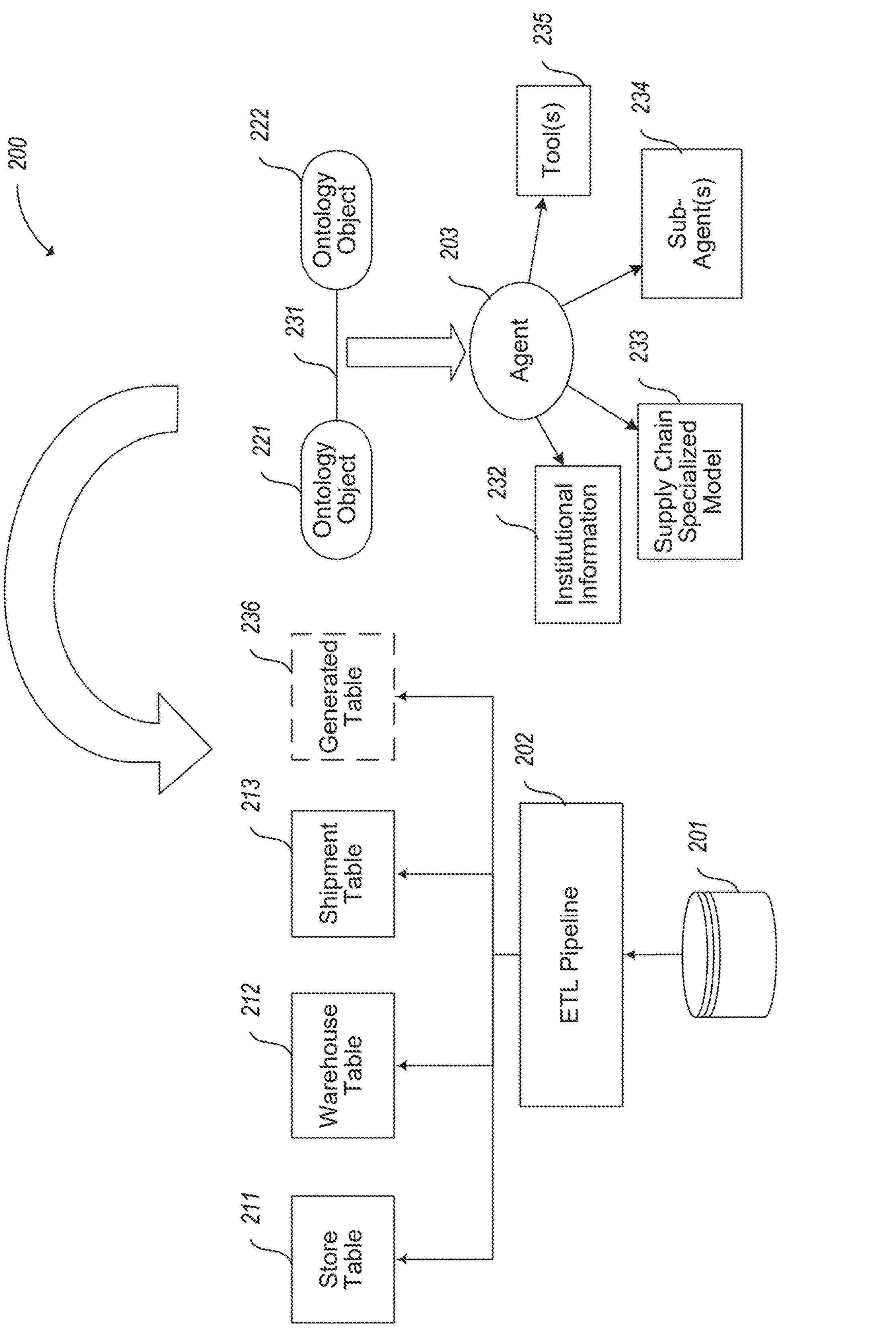
FIG. 2 is a block diagram of a sample environment in which the facility operates, according to some embodiments.

FIG. 2 is a block diagram of a sample environment 200 in which the facility operates, according to some embodiments described herein. The environment 200 includes one or more data repositories 201, an ETL pipeline 202, and an agent 203. The data repositories 201 store raw data generated by computing systems or processes associated with a subject organization's supply chain. The ETL pipeline 202 extracts, transforms, and loads the raw data from the data repositories 201 into a usable format and organizes the data in one or more data storage devices. For example, the ETL pipeline may generate one or more data tables from data included in the data repositories 201 such as the store table 211, warehouse table 212, and shipment table 213.

The store table 211 includes data associated with one or more stores to which goods associated with the subject organization are transported. The store table 211 may include data associated with a plurality of stores, such as shipments of goods a store has received, orders for goods a store has requested, an amount of goods sold by the store, when goods are to be delivered to the store, a location of the store, and other data associated with the supply chain of the subject organization and the store. The warehouse table 212 includes data associated with one or more warehouses where goods associated with the subject organization are kept. The warehouse table 212 may include data associated with a plurality of warehouses, such as which goods are kept in a warehouse, a quantity of goods kept in the warehouse, shipment orders for goods kept in the warehouse, a location of the warehouse, and other data associated with the supply chain of the subject organization and the warehouse. The shipment table 213 includes data associated with one or more shipments of goods within the supply chain associated with the subject organization. The shipment table 213 may include data associated with a plurality of shipments, such as orders for goods from a store, warehouses from which the goods are to be shipped to the store, a price for shipping the goods, a price for the goods being shipped, a quantity of the goods being shipped, the type of goods being shipped, and other data associated with the supply chain of the subject organization and the shipments.

The data stored in each of the one or more data tables may be represented as one or more "data objects" that are each associated with an ontology object, such as the ontology objects 221 and 222. The ontology objects 221 and 222 include natural language descriptions that describe the contents and significance of the data object and one or more properties of the data object. In some embodiments, the ontology objects include a pointer to one or more storage locations of the data object, such as a pointer to a data table.

The agent 203 is an artificial intelligence agent that uses a foundational model to generate a response to a prompt. The artificial intelligence agent may be instantiated with one or more directives for augmenting prompts with information before causing a foundational model to be applied to the augmented prompts. In some embodiments, the agent augments a prompt by embedding data into the prompt. The agent uses the ontology objects 221 and 222, institutional information 232, tools 235, and sub-agents 234 to augment a prompt. The institutional information 232 includes a natural language text description of the subject organization's operational processes. In some embodiments, the agent 203 operates on top of a foundational model to control the consumption of data by the foundational model. In such embodiments, the agent 203 may be organized in one or more layers, such as: an ontology expansion layer that resolves references to data objects by using ontology objects; an agent skill registry layer that matches one or more prompts to one or more decision applications, signal summaries or orchestration skills; a graph memory expansion layer that retrieves recent interactions, anomalies, exceptions, and decisions; a session-level context tracking layer that maintains context for an agent during sessions where an agent receives one or more follow-up prompts. In some embodiments, the agent 203 includes data generated via one or more of the layers into an augmented prompt.

The tools 235 are tools that may be used to perform one or more tasks, retrieve data not included in the data repository 201, or perform other actions. In some embodiments, information regarding each of the tools, such as a natural language text description of how to access and use the tools, is included in a tool object. In some embodiments, the tools 235 include internal tools associated with the subject organization, external tools not associated with the subject organization, other tools, or some combination thereof. In some embodiments, the tools are used to trigger one or more corrective actions, such as replanning orders, replanning distributions of goods, notifying one or more entities that are associated with the subject organization, etc.; pull data from one or more internal databases, external databases, other data stores, or a combination thereof; launch and execute decision applications to propose one or more decisions with modifiable parameters; receive data from one or more vector stores; apply one or more formulas to data; perform other tasks related to the subject organization's supply chain; or some combination thereof.

The sub-agents 234 perform specialized actions associated with generating a response to the prompt. In some embodiments, the agent 203 may invoke a sub-agent 234 to perform one or more specialized actions indicated by transmitting a second prompt to the sub-agent 234. In some embodiments, the sub-agent 234 generates a response to the second prompt in a similar manner to how the agent 203 generates a response to a prompt. In some embodiments, the agent 203 augments a prompt based on a generated response received from the sub-agent.

The agent 203 applies a supply chain specialized foundational model 233 to the augmented prompt to receive a response to the prompt. In some embodiments, the specialized supply chain foundational model receives data from one or more of the tools 235 based on the augmented prompt. In some embodiments, the specialized supply chain foundational model receives data associated with one or more data objects based on the augmented prompt. In such embodiments, the supply chain specialized foundational model may identify a link 231 between one or more ontology objects, such as the ontology objects 221 and 222. In some embodiments, the specialized supply chain foundational model receives the data associated with the one or more data objects based on the identified link 231. In some embodiments, data associated with the one or more data objects is received via a query of one or more data tables, such as the store table 211, warehouse table 212, shipment table 213, generated table 236, or other data tables. In some embodiments, the agent causes a table to be generated based on the response generated by the supply chain specialized foundational model 233, such as the generated table 236.

Figure 3:
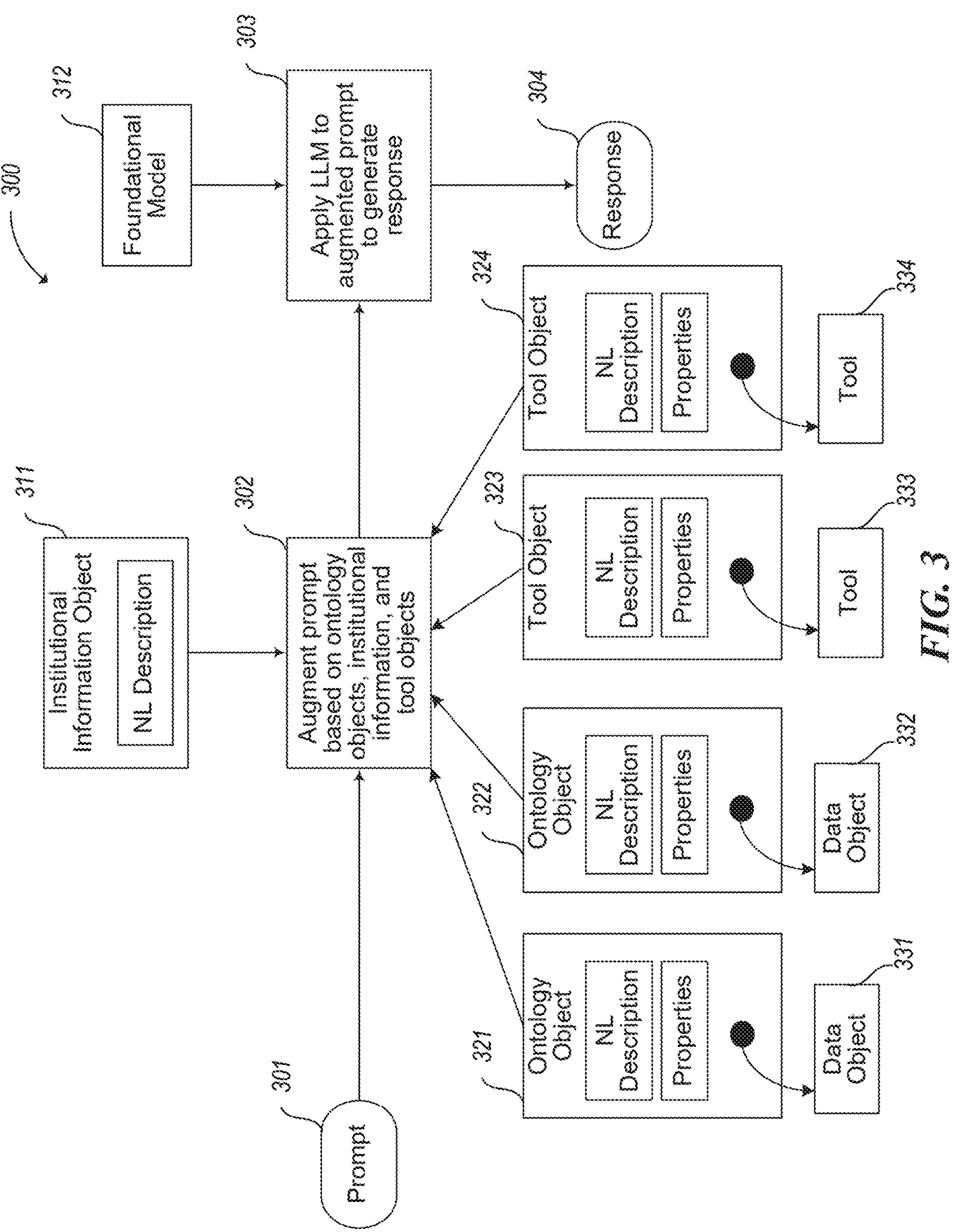
FIG. 3 is a data flow diagram of a sample data flow for generating a response to a prompt, used by the facility in some embodiments.

FIG. 3 is a data flow diagram of a sample data flow 300 for generating a response to a prompt, used by the facility in some embodiments. The facility receives a prompt 301, such as via user input. In some embodiments, the facility provides the prompt 301 to an agent, such as the agent 203 described above in connection with FIG. 2.

The facility augments the prompt based on: one or more ontology objects, such as the ontology objects 321 and 322; an institutional information object, such as the institutional information object 311; and one or more tool objects, such as the tool objects 323 and 324.

The ontology objects 321 and 322 may be similar to the ontology objects 221 and 222 described above in connection with FIG. 3. The ontology objects 321 and 322 include a natural language text description of the data object, an indication of one or more properties of the data object, and an indication of one or more pointers to one or more data objects, such as the data objects 331 and 332. In some embodiments, the indication of one or more properties of the data object are included in the natural language text description of the data object. In some embodiments, the natural language text description of a data object indicates the contents and significance of a data object associated with the ontology object.

The institutional information object 311 includes a natural language text description of institutional information associated with the subject organization's supply chain. The natural language text description of institutional information may include information associated with one or more operational processes of the subject organization's supply chain.

The tool objects 323 and 324 include a natural language text description of a tool represented by the tool object, a use of the tool, how to use the tool, other data associated with the tool, or some combination thereof. The tool objects 323 and 324 may include an indication of one or more properties of the tool represented by the tool object. The tool objects 323 and 324 include an indication of one or more pointers to one or more tools, such as the tools 333 and 334.

The facility applies a foundational model 312 to the augmented prompt to generate a response 304. In some embodiments, the foundational model 312 is the specialized supply chain foundational model 233 described below in connection with FIG. 2. In some embodiments, the response 304 includes data generated by the foundational model by using one or more of the tool objects 323 and 324. In some embodiments, the response 304 is used to generate a data table, such as the generated data table 236 described above in connection with FIG. 2.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
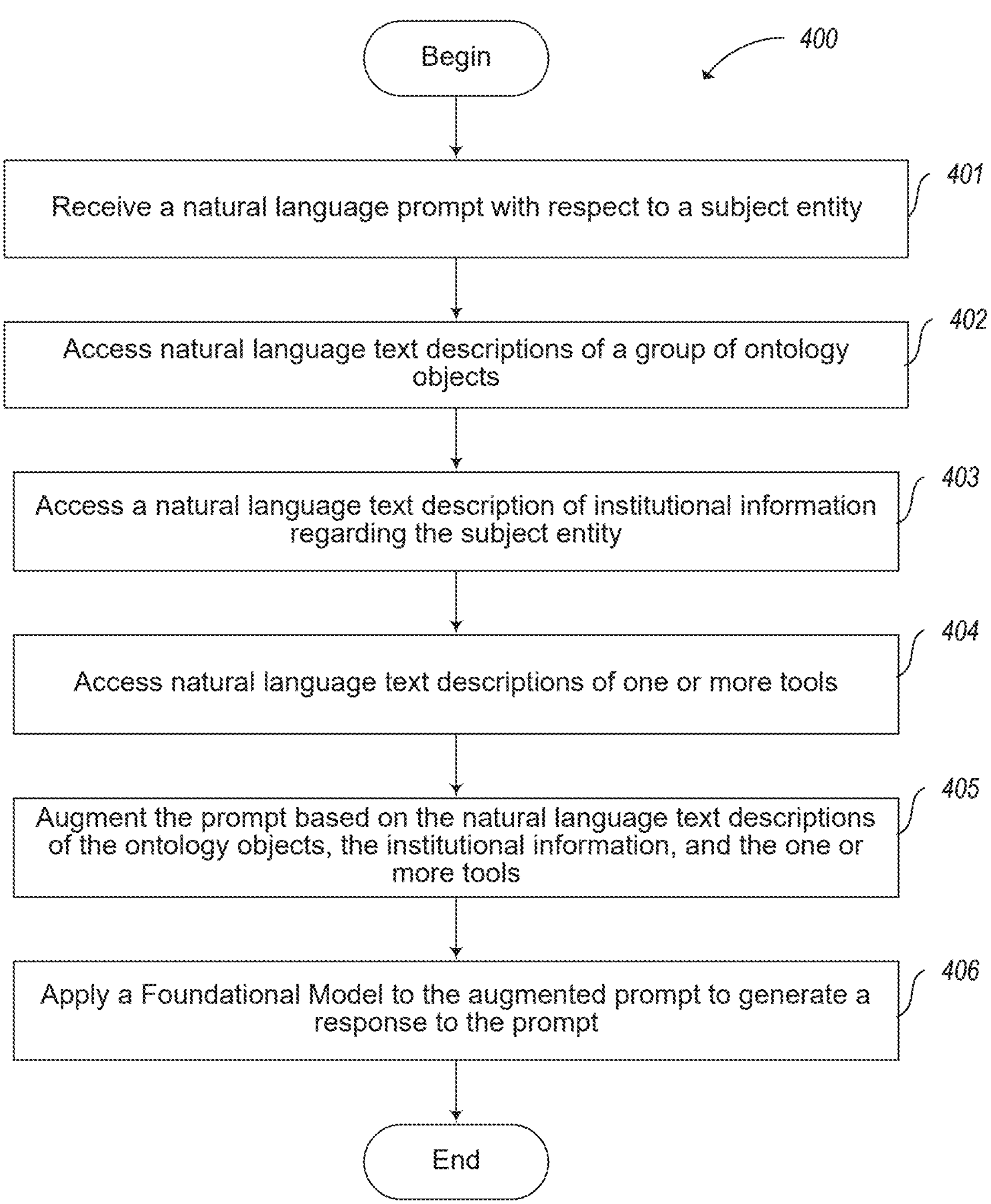
FIG. 4 is a flow diagram of a sample process to generate a response to a prompt, used by the facility in some embodiments.

FIG. 4 is a flow diagram of a sample process 400 to generate a response to a prompt, used by the facility in some embodiments described herein.

At act 401, the facility receives a natural language prompt with respect to a subject organization.

At act 402, the facility accesses natural language text descriptions of a group of ontology objects. In some embodiments, the ontology objects are similar to the ontology objects 321 and 322 described above in connection with FIG. 3.

At act 403, the facility accesses a natural language text description of institutional information regarding a subject organization. In some embodiments, the facility receives the natural language text description of institutional information from an institutional information object, such as the institutional information object 311 described above in connection with FIG. 3.

At act 404, the facility accesses natural language text descriptions of one or more tools. In some embodiments, the facility receives the natural language text description of the one or more tools from one or more tool objects, such as the tool objects 323 and 324 described above in connection with FIG. 3.

At act 405, the facility augments the prompt based on the natural language text descriptions of the data objects, the institutional information, and the one or more tools.

At act 406, the facility applies a foundational model to the augmented prompt to generate a response to the prompt. In some embodiments, the foundational model is a specialized supply chain foundational model, such as the specialized supply chain foundational model 233, described above in connection with FIG. 2.

After act 406, the facility ends.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIG. 5 is a table diagram of a sample data object data table 500, used by the facility in some embodiments described herein. The data object data table 500 includes an ontology object identifier column 501, a properties column 502, a description column 503, and a data objects column 504. The rows 510 and 511 each include data indicating an ontology object.

The ontology object identifier column 501 includes data indicating an identifier for an ontology object. The properties column 502 includes data indicating one or more properties of the data object. In some embodiments, the one or more properties are associated with a data table associated with the ontology object.

The description column 503 includes data indicating a natural language text description of an ontology object. The data objects column 504 includes data indicating a data table or other data object associated with an ontology object. In some embodiments, the data indicating a data table or other data object associated with an ontology object includes a pointer to the data table or other data object.

In an example, a user may submit a prompt that requests a forecast of product sales in the next sixty days. In this example, an agent augments the prompt based on the product ontology object indicated in row 510 and sales ontology object indicated in row 511 to include the description of each object indicated in the description column 503 and the indication of the data tables associated with each object indicated in the data objects column 504. In some embodiments, the agent also augments the prompt based on the data indicating one or more properties of each object included in the properties column 502. Continuing the example, the agent may apply a large language model to the augmented prompt to generate a response to the prompt that includes the forecast of product sales in the next sixty days. In some embodiments, the response to the prompt is used to generate a data table, such as the generated data table 600 described below in connection with FIG. 6.

Figure 6:
FIG. 6 is a table diagram of a sample generated data table, used by the facility in some embodiments.

FIG. 6 is a table diagram of a sample generated data table, used by the facility in some embodiments described herein. The generated data table 600 includes a product identification column 601, a thirty-day forecast column 602, and a sixty-day forecast column 603. The rows 610, 611, and 612 indicate forecasts of product sales for one or more products associated with a subject organization's supply chain. At least a portion of the contents of the generated data table 600 may be included in a response generated by a foundational model, such as the specialized supply chain foundational model described above in connection with FIG. 2.

The product identification column 601 includes data indicating one or more product identifiers for a product associated with the subject organization's supply chain. The thirty-day forecast column includes a thirty-day forecast of sales of a product associated with the subject organization's supply chain. The sixty-day forecast column includes a sixty-day forecast of sales of a product associated with the subject organization's supply chain.

Continuing the example described above, the prompt may include a request to generate a determination of how goods should be distributed within the subject organization's supply chain based on forecasted sales for a plurality of geographic regions. In such an example, the agent that receives the prompt may cause one or more sub-agents to be instantiated, such as the sub-agents 234 described above in connection with FIG. 2. The agent causes the one or more sub-agents to generate a forecast of sales for the plurality of regions. The agent that receives the prompt augments the prompt to include the one or more responses received from the one or more sub-agents. The agent causes a foundational model to be applied to the augmented prompt to generate a response to the original prompt.

Figure 7:
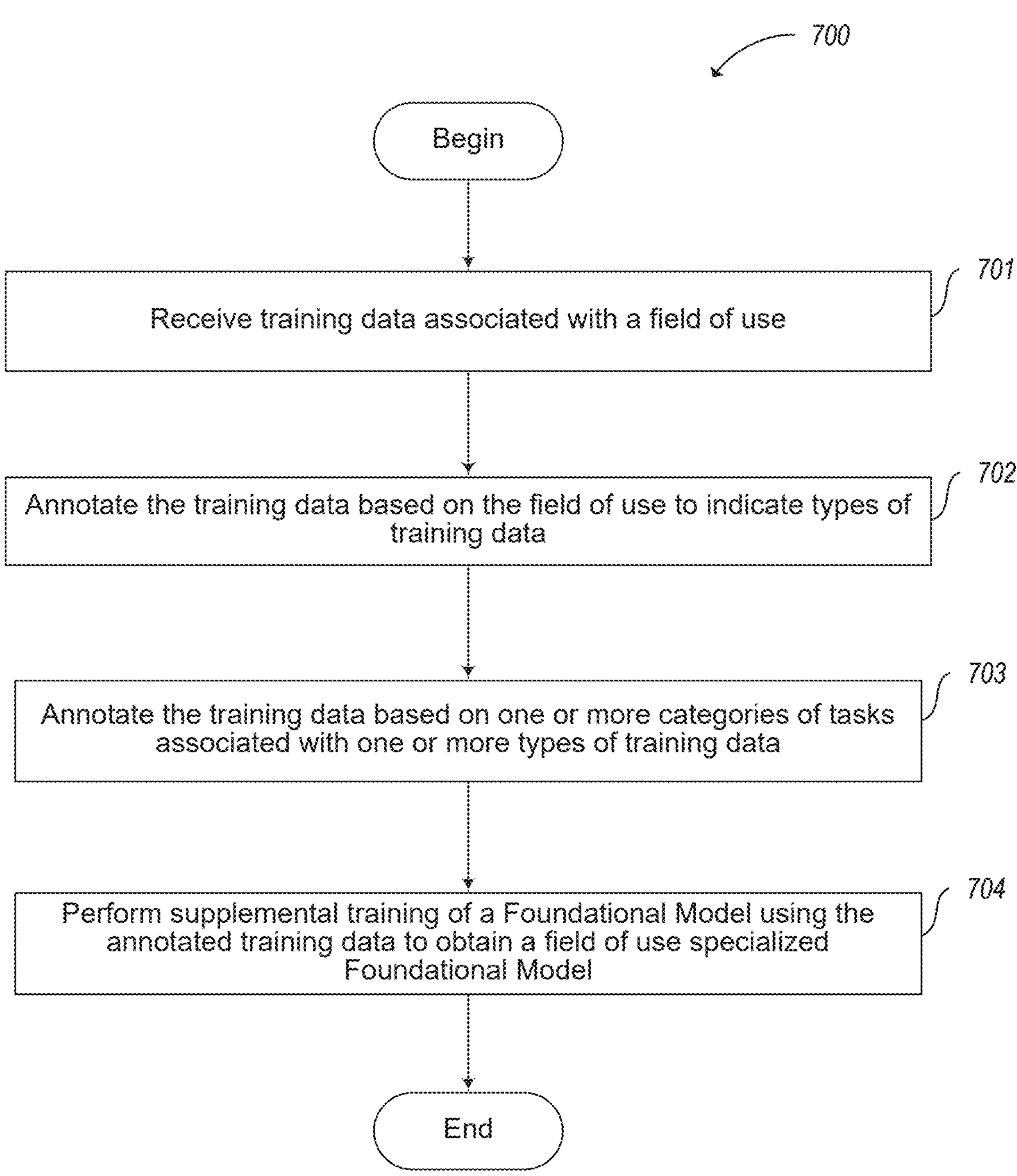
FIG. 7 is a flow diagram of a sample process to train a large language model, used by the facility in some embodiments.

FIG. 7 is a flow diagram of a sample process to train a large language model, used by the facility in some embodiments described herein.

At act 701, the facility receives training data associated with a field of use. In some embodiments, the field of use is supply chain analysis. In some embodiments, the training data includes one or more textbooks, scientific papers, blog posts, conference transcripts, laws, regulations, rules, or other data associated with the field of use. In some embodiments, the training data includes structured data, such as SQL and query logs, inventory movement events, forecast deviation logs, transport plans, other structured supply chain data, or some combination thereof. In some embodiments, the training data includes unstructured data, such as supply chain nomenclature documents, logistics documents, manuals, supplier onboarding documents, academic certification texts, supply chain research, policy documents, other unstructured supply chain data, or some combination thereof. In some embodiments, the training data includes operational logs, such as planner-agent chat transcripts, helpdesk emails, escalation workflows, cross-functional review meeting summaries, other logs associated with a supply chain, or some combination thereof.

At act 702, the facility annotates the training data based on the field of use to indicate types of training data. In some embodiments, the types of training data include one or more of: formulae, terminology, operations, optimizations, rules, laws, restrictions, other types of data associated with a field of use, or some combination thereof.

At act 703, the facility annotates the training data based on one or more categories of tasks associated with one or more types of training data. In some embodiments, the one or more categories of tasks include one or more of: generating forecasts, identifying where goods are located in the supply chain, identifying inefficiencies in the supply chain, identifying causes of disruptions to the supply chain, determining how goods are to be distributed within the supply chain, other tasks, or some combination thereof. In some embodiments, the annotations regarding categories of tasks include indications of tools, data, etc., that may be used to accomplish the task. In such embodiments, the foundational model may be trained to determine whether one or more sub-agents, tools, etc., should be used to generate a response to a prompt.

At act 704, the facility performs supplemental training of a general-purpose foundational model using the annotated training data to obtain a field of use specialized foundational model. In some embodiments, the specialized foundational model is trained to filter sensitive data out of responses to prompts based on one or more rules, such as by redacting or not including the sensitive data. In some embodiments, the specialized foundational model is trained to prevent the inclusion of references to unknown processes, objects, and fields when generating a response to a prompt. In some embodiments, the specialized foundational model is trained to include a traceable rationale, citations to data objects, etc., in responses generated by the specialized foundational model.

After act 704, the process 700 ends.

In some embodiments, the facility stores data indicating user interactions with responses generated by the specialized foundational model, such as edits, rejecting or accepting suggestions, etc. In such embodiments, the data indicating user interactions with responses generated by the specialized foundational model may be used to improve the foundational model. In some embodiments, the data indicating user interactions is aggregated across multiple users to obtain one or more user trust scores. In such embodiments, the facility may use the user trust scores to determine how future prompts can be conditioned to improve the performance of the foundational model.

Figure 8:
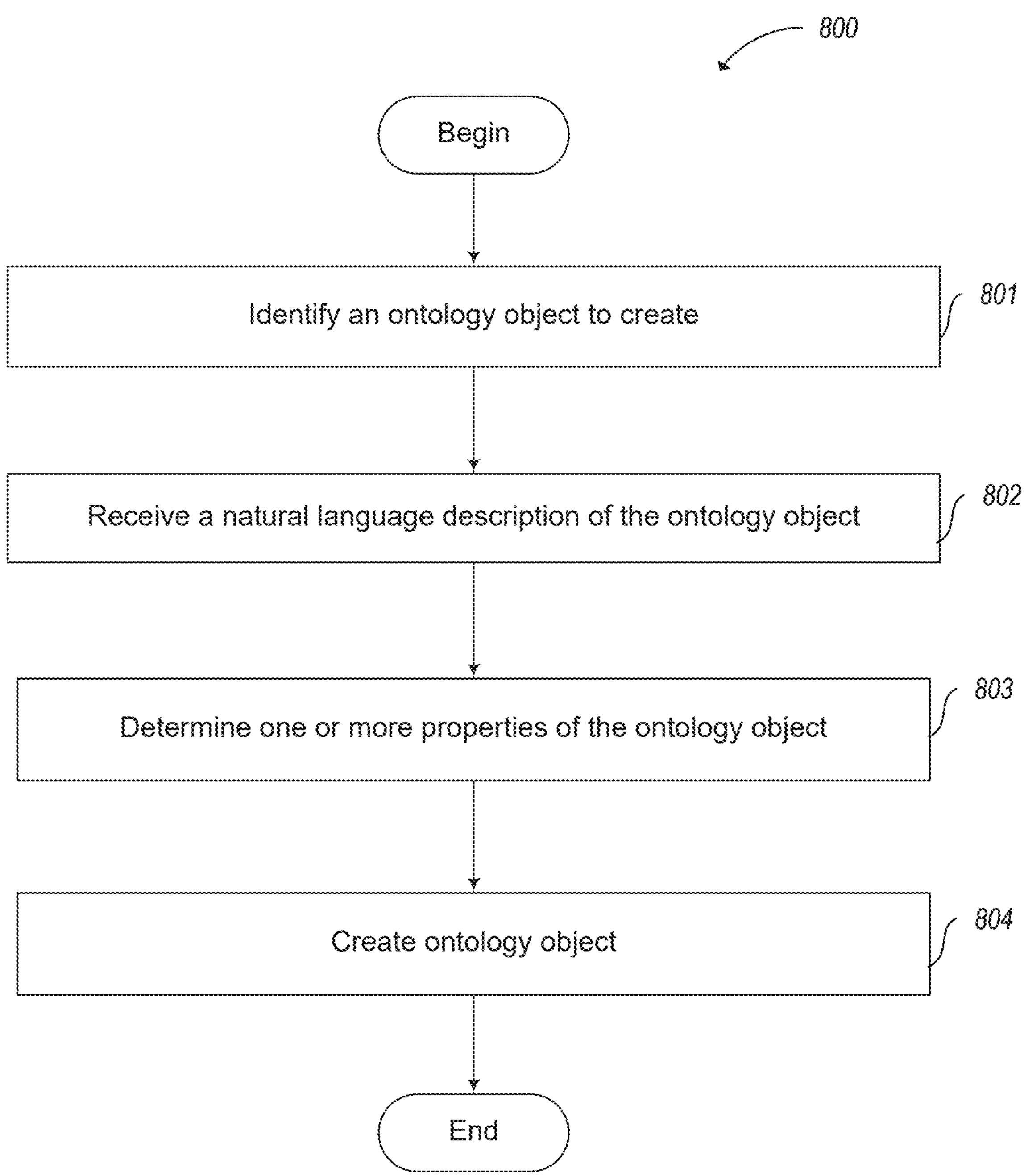
FIG. 8 is a flow diagram of a sample process to generate a natural language description of an ontology object, used by the facility in some embodiments.

FIG. 8 is a flow diagram of a sample process 800 to generate a natural language description of an ontology object, used by the facility in some embodiments.

At act 801, the facility identifies an ontology object to create. In some embodiments, the facility identifies an ontology object to create based on one or more data objects, such as a data table or other type of data object, created via the ETL pipeline 202, described above in connection with FIG. 2.

At act 802, the facility receives a natural language text description of the data object. In some embodiments, the facility receives the natural language text description via user input.

At act 803, the facility determines one or more properties of the data object. In some embodiments, the facility determines one or more properties of the data object based on one or more properties of a data object associated with the ontology object. For example, if the data object is a data table, the one or more properties may include the columns of the data table.

At act 804, the facility creates the ontology object based on the natural language description of the data object and the one or more properties of the data object. In some embodiments, creating the ontology object includes incorporating a pointer to a data object represented by the ontology object into the ontology object.

Figure 9:
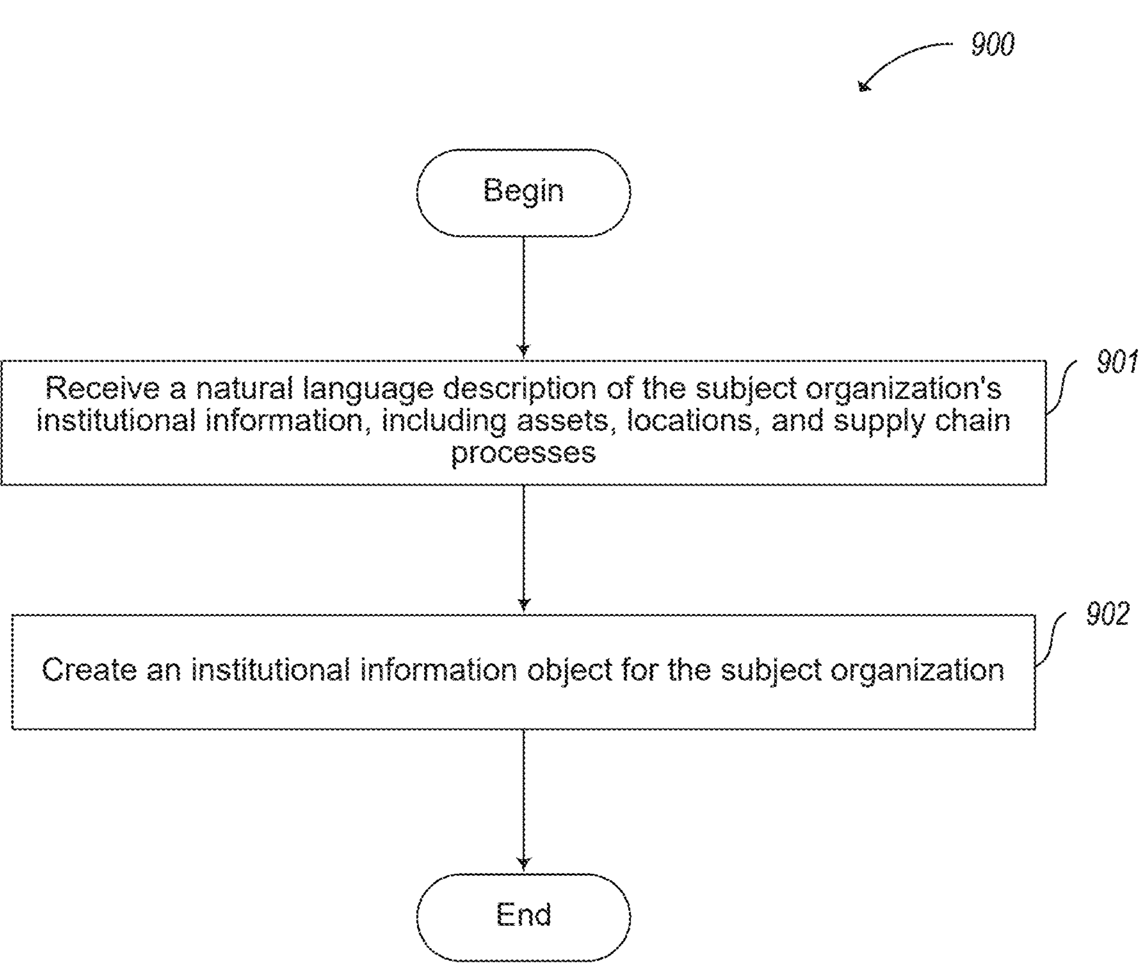
FIG. 9 is a flow diagram of a sample process to generate a natural language description of a subject organization's operational processes, used by the facility in some embodiments.

FIG. 9 is a flow diagram of a sample process 900 to generate a natural language description of an operational process, used by the facility in some embodiments.

At act 901, the facility receives a natural language description of the subject organization's institutional information, including assets, locations, and supply chain processes. In some embodiments, the facility receives the natural language description via user input.

At act 902, the facility creates an institutional information object for the subject organization.

After act 902, the process 900 ends.

Figure 10:
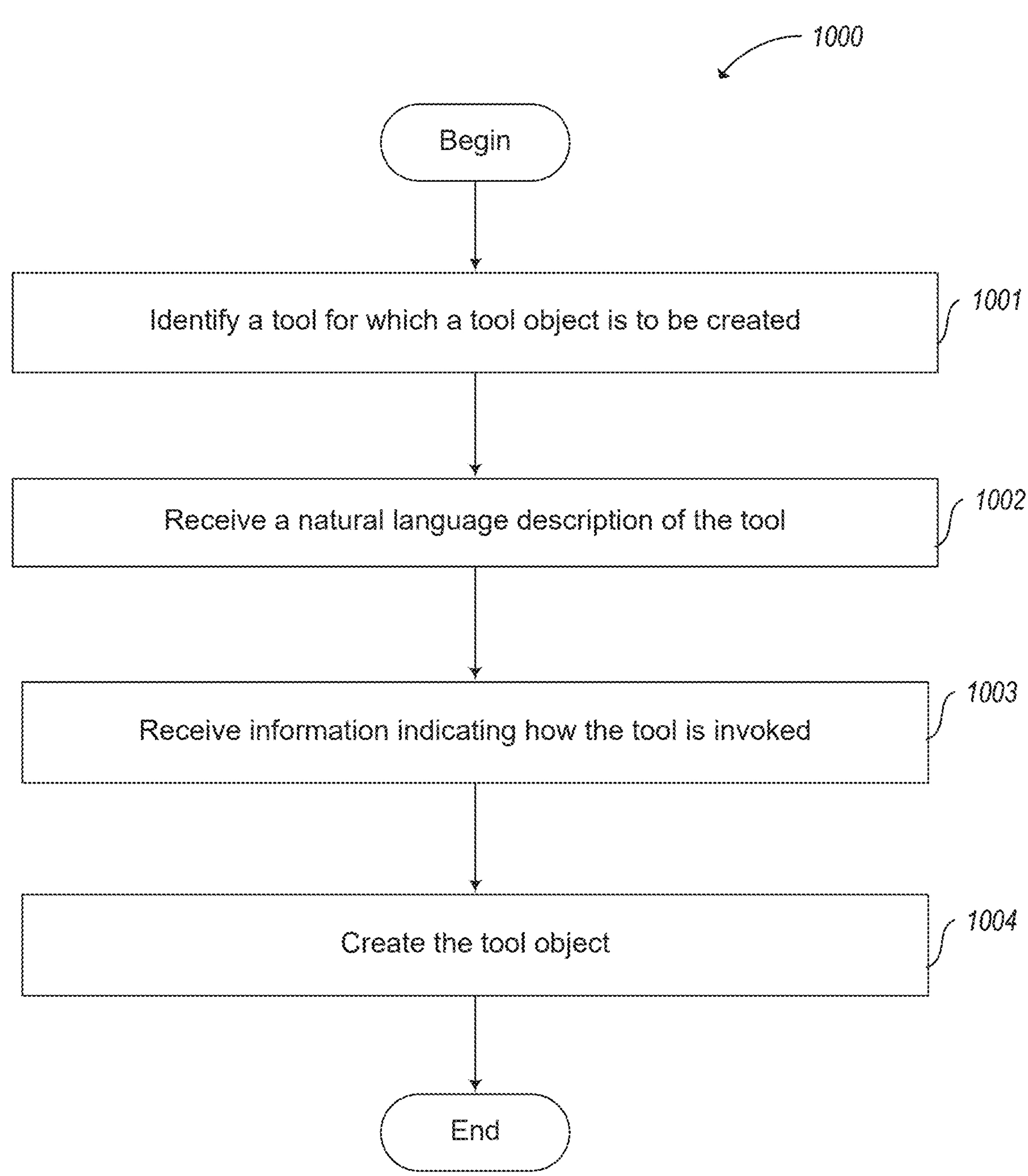
FIG. 10 is a flow diagram of a sample process to generate a tool object, used by the facility in some embodiments.

FIG. 10 is a flow diagram of a sample process 1000 to generate a tool object, used by the facility in some embodiments.

At act 1001, the facility identifies a tool for which a tool object is to be created. In some embodiments, the facility identifies the tool based on a set of one or more tools associated with, used by, etc., the subject organization to generate or analyze data, take actions, etc. In some embodiments, the tools: trigger one or more corrective actions, such as replanning orders, replanning distributions of goods, notifying one or more entities that are associated with the subject organization, etc.; pull data from one or more internal databases, external databases, other data stores, or a combination thereof; launch and execute decision applications to propose one or more decisions with modifiable parameters; receive data from one or more vector stores; apply one or more formulas to data; perform other tasks related to the subject organization's supply chain; or some combination thereof.

At act 1002, the facility receives a natural language text description of the tool. In some embodiments, the facility receives the natural language text description via user input. In some embodiments, the natural language text description includes information indicating how the tool is used, one or more types of data used by the tool as input, one or more types of data output by the tool, how the tool is accessed, other data associated with the tool, or some combination thereof.

At act 1003, the facility receives information indicating how the tool is invoked. In some embodiments, the tool is accessed via a function that is invoked by a large language model, an agent, the facility, or some combination thereof. In such embodiments, instructions for invoking the function used to access the tool is included in the natural language text description of the tool.

At act 1004, the facility creates the tool object based on the natural language description of the tool. In some embodiments, creating the tool object includes incorporating a pointer into the tool object that points to the tool, an application that can invoke the tool, a function that can invoke the tool, or some combination thereof. After act 1004, the process 1000 ends.

Figure 11:
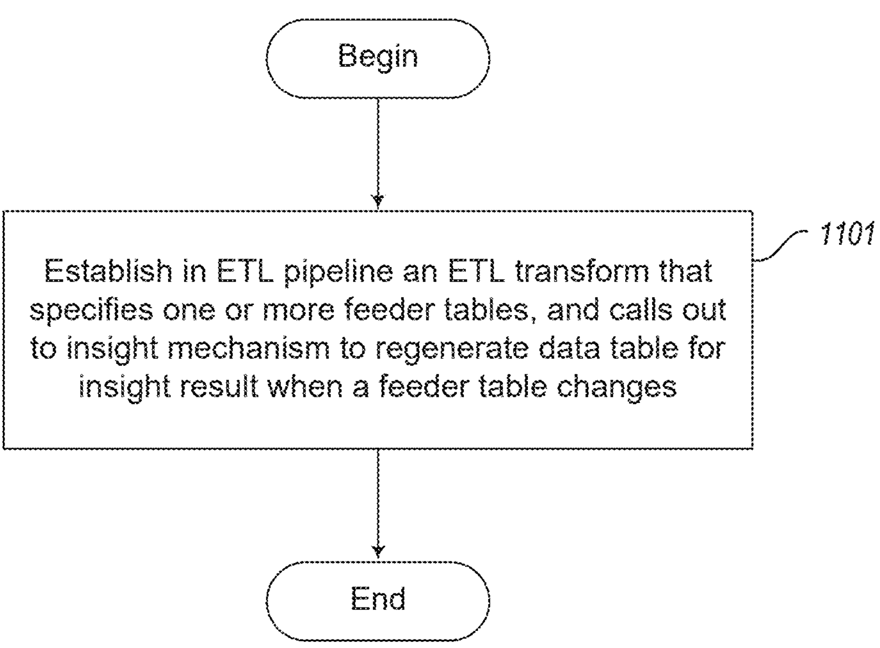
FIG. 11 is a flow diagram showing a process performed by the facility to augment an ETL pipeline to automatically maintain the currency of a derived supply chain insight data object.

FIG. 11 is a flow diagram showing a process performed by the facility to augment an ETL pipeline to automatically maintain the currency of a derived supply chain insight data object. In act 1101, the facility establishes in the supply chain ETL pipeline for the subject organization an ETL transform for the derived insight. This transform specifies one or more feeder tables in the ETL pipeline, which may each be either a raw data table received directly from source data stores, or a derived data table populated by an existing ETL transforms in the ETL pipeline. The transform established by the facility further specifies calling out to an insight mechanism to generate a current version of a derived insight result data table for the insight when the contents of any of the specified feeder tables change. In various embodiments, the insight mechanism is a procedural analytical algorithm—such as, for example, a gradient-boosting demand forecaster, an inventory-rebalancing heuristic, or a statistical anomaly detector—or a prompt for invoking an LLM or other generative model. The ETL transform establishes the table returned by the insight mechanism as the insight data table.

In some embodiments, the facility organizes the ETL transform for the derived insight as shown below in Table 1.

TABLE 1

| Field | Value |
| --- | --- |
| model_id | qtr_forecast_lightgbm_v1 |
| horizon_quarters | 4 |
| groupby_keys | product_id |
| features | avg_price_index, promo_flag, holiday_flag |
| target | sales_units by quarter |
| output_object | ForecastQuarterlySales |
| sources | SalesOrderLine, Product, Calendar, PromotionEvent, PriceIndex |
| key_joins | product_id across sources, order_date to date, order_date within promo window |

TABLE 1-continued

| Field | Value |
| --- | --- |
| filters | order_date from Jan. 1, 2023 to Jun. 30, 2025, quantity greater than 0 |
| aggregation_grain | product_id and quarter_start |

Figure 12:
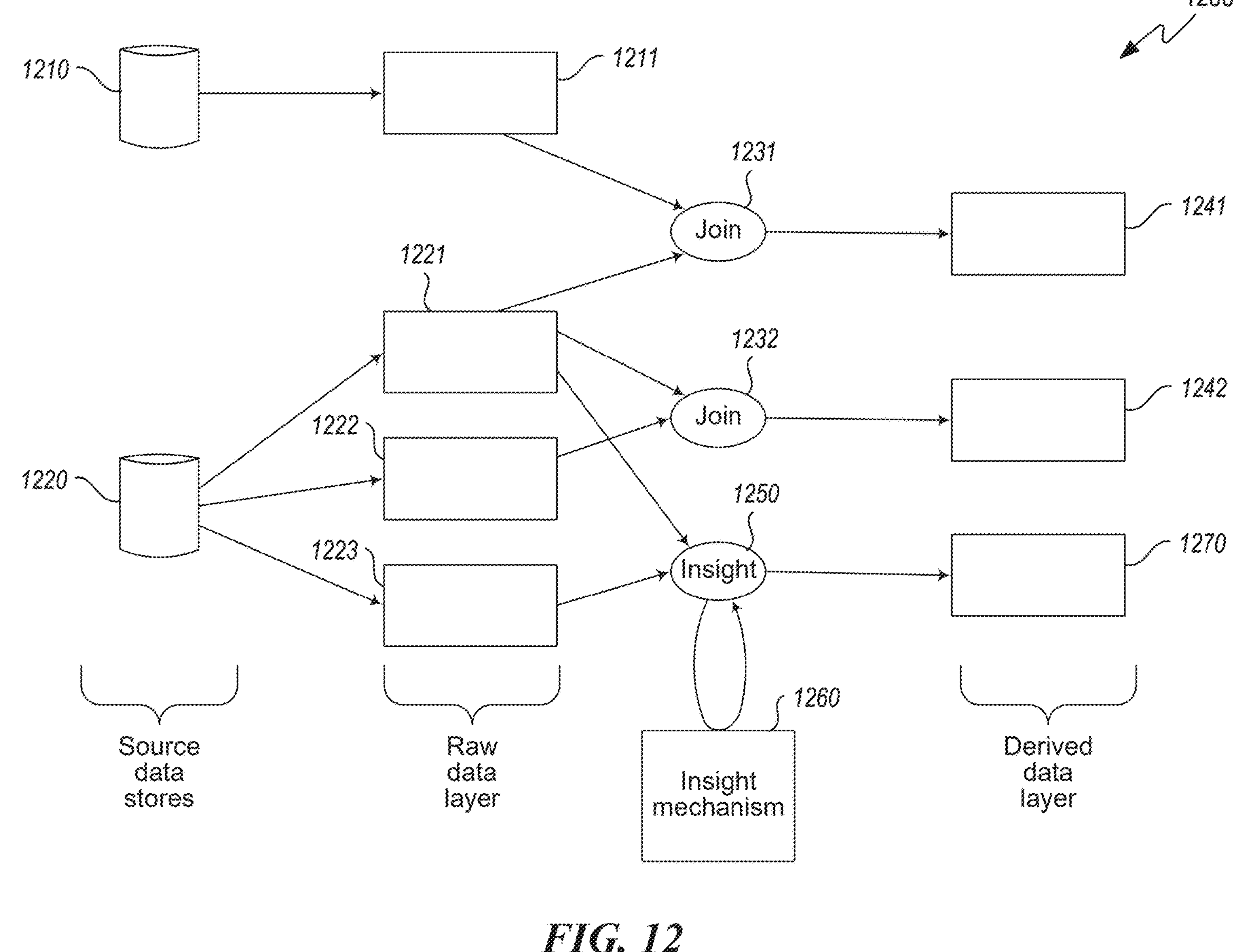
FIG. 12 is a data flow diagram showing a sample ETL pipeline in which an ETL transform has been established for the derived insight.

FIG. 12 is a data flow diagram showing a sample ETL pipeline in which an ETL transform has been established for the derived insight. The ETL pipeline 1200 begins with source data stores, such as source data stores 1210 and 1220, from which raw data tables are extracted, such as data tables 1211, 1221, 1222, and 1223. Conventionally, the ETL pipeline uses STL transform nodes that each specify an SQL operation against feeder data tables in the pipeline to produce additional derived data tables in the pipeline, such as transform node 1231 producing data table 1241 by joining data tables 1211 and 1221, and transform node 1232 producing data table 1242 by joining data tables 1221 and 1222. As discussed above in connection with FIG. 11, the facility establishes in this ETL pipeline a transform node 1250 for producing data table 1270 containing the results of a derived insight operation, based on the contents of feeder tables 1221 and 1223. The insight transform node 1250 contains identifying information that it uses to invoke an insight mechanism 1260. In various embodiments, the transform node is set to invoke the insight mechanism in response to a change in any of the feeder data tables—here data tables 1221 and 1223, the expiration of a recurring refresh period, or based upon some other trigger. The facility further establishes a natural language interface to this derived insight data table via an ontology object for the derived insight as discussed below.

Figure 13:
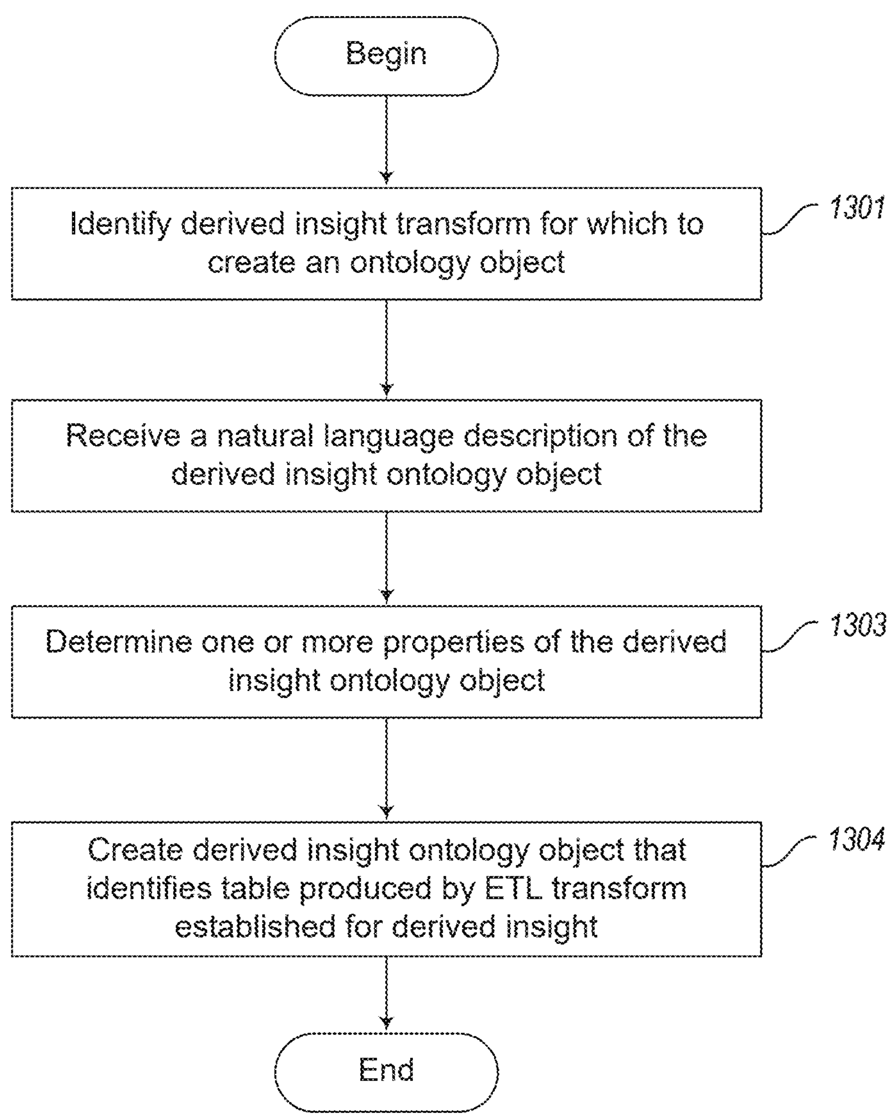
FIG. 13 is a flow diagram showing a process performed by the facility in some embodiments to establish a derived insight ontology object.

FIG. 13 is a flow diagram showing a process performed by the facility in some embodiments to establish a derived insight ontology object. In act 1301 the facility identifies a derived insight transform for which to create an ontology object, such as transform 1250 shown in FIG. 12. In act 1302, the facility receives a natural language description of the derived insight ontology object. In act 1303, the facility determines one or more properties of the derived insight ontology object. In act 1304, the facility creates a derived insight ontology object that identifies the table produced by the ETL transform that was established for the derived insight, such as data table 1270 shown in FIG. 12. After act 1304, this process concludes.

In some embodiments, the facility organizes the created ontology object as shown below in Table 2.

TABLE 2

| Field | Value |
| --- | --- |
| object_name | ForecastQuarterlySales |
| nl_description | Quarterly forecast by product for the next four fiscal quarters with units, revenue, and prediction intervals. |
| primary_key | product_id, quarter_start_date |
| fields | product_id, quarter_start_date, quarter_label, forecast_units, forecast_revenue_usd, pi80_low, pi80_high, model_version, insight_id, created_at |

Figure 14:
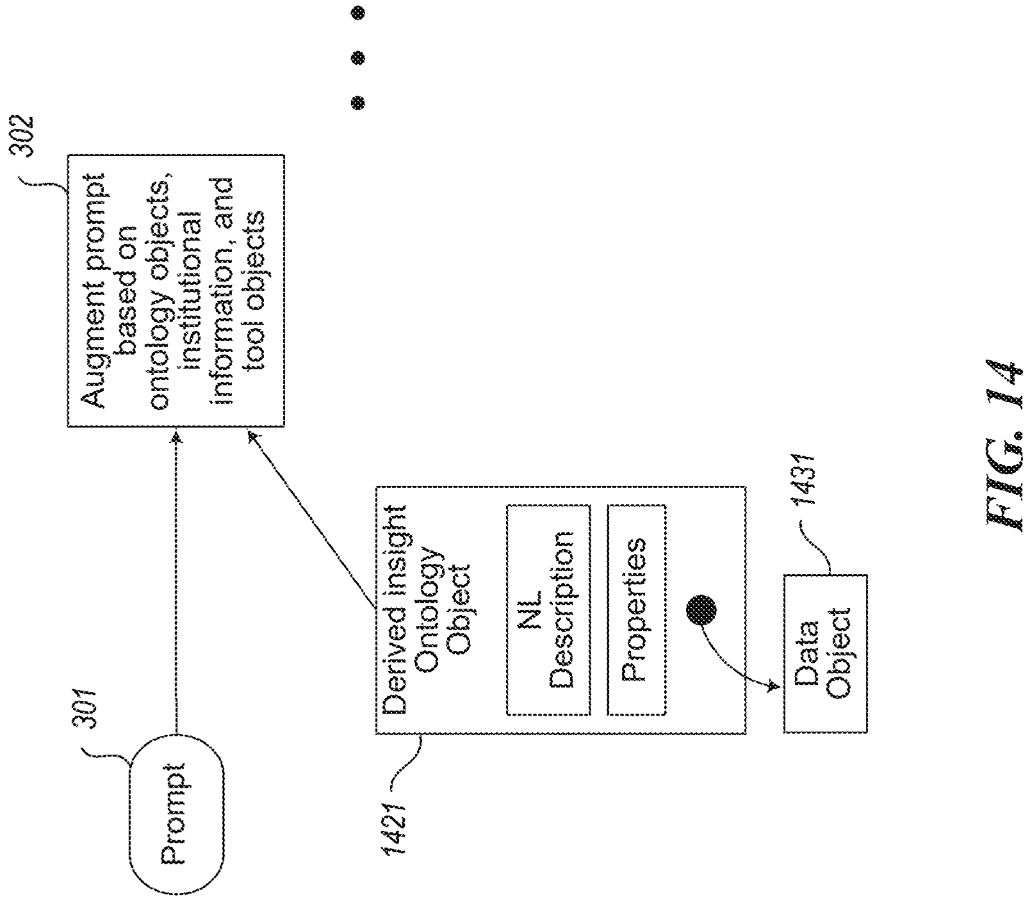
FIG. 14 is a partial data flow diagram showing the facility's establishment of a derived insight ontology object.

FIG. 14 is a partial data flow diagram showing the facility's establishment of a derived insight ontology object. FIG. 14 extends the data flow shown in FIG. 3 and discussed above. In particular, it shows that an additional derived insight ontology object 1421 is included in the prompt augmentation that occurs in step 302. The derived insight ontology object contains a natural language description of the ontology object and its underlying data object 1431, and contains identifying information usable to reference and access that underlying data object. As the result of the inclusion of the derived insight ontology object in the augmented prompt, the derived insight results contain by the data object are usable by the facility as part of generating a response to the prompt.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system, comprising:

accessing an extract-transform-load ("ETL") pipeline configured to act on dynamic supply chain data for a subject organization available from one or more data sources, the ETL pipeline comprising a plurality of tables and one or more ETL transform nodes, one or more first tables each being populated from the one or more data sources, one or more second tables each being populated by an ETL transform node of the one or more ETL transform nodes based on content of one or more feeder tables of the ETL transform node;

establishing in the ETL pipeline an insight ETL transform node identifying one or more of the plurality of tables as insight feeder tables, the insight ETL transform node specifying an insight mechanism, the insight ETL transform node being configured to invoke the specified insight mechanism passing contents of the insight feeder tables to populate an insight results data table among the plurality of tables; and constructing an insight ontology object that references the insight results data table and contains a natural language text description of the insight results data table, the natural language text description being different from the properties of the insight results data table and describing the contents and significance of the insight results data table, such that the insight results data table is configured to be automatically recurringly populated through the ETL pipeline, and is available for access and use by a language model configured to access the insight results data table based on the natural language text description contained in the constructed insight ontology object to service a prompt concerning dynamic supply chain data for the subject organization.

2. The method of claim 1 wherein the insight mechanism specified by the insight ETL transform node is a procedural analytical algorithm.

3. The method of claim 1 wherein the insight mechanism specified by the insight ETL transform node is a prompt for invoking a generative model.

4. The method of claim 1, further comprising:

adding the constructed insight ontology object to a set of resources available for use by the language model, the set of resources comprising:

a plurality of additional ontology objects, each of the additional ontology objects referencing a data object, and containing a natural language text description of the referenced data object describing its contents and significance, and a natural language text description of the subject organization's supply chain institutional information comprising operational processes of the subject organization's supply chain.

5. The method of claim 4, further comprising:

receiving a prompt;

invoking the language model to process the prompt using the set of resources;

receiving a result from the invoked language model; and causing the received result to be outputted.

6. The method of claim 5 wherein the invoked language model is a specialized large language model trained to understand supply chain vocabulary, processes, and analysis.

7. One or more instances of computer-readable media not constituting a signal per se, the one or more instance of computer-readable media collectively storing a data structure, the data structure comprising:

an extract-transform-load ("ETL") pipeline configured to act on dynamic supply chain data for a subject organization, the ETL pipeline comprising:

a plurality of ETL transform nodes;

an insight ontology object that references a corresponding table configured to be populated by a distinguished ETL transform node and contains a natural language text description of a table configured to be populated by the distinguished ETL transform node describing its contents and significance, the natural language text description being distinct from the properties of the table; and a multiplicity of tables, each of a plurality of first tables among the multiplicity of tables configured to be populated by an ETL transform node of the plurality of ETL transform nodes based upon content of one or more feeder tables of the ETL transform node, an insight ETL transform node of the plurality of ETL transform nodes specifying an insight mechanism to be invoked by the distinguished ETL transform node with contents of the distinguished ETL transform node's one or more feeder tables to populate a corresponding table with a derived insight result, such that, when the distinguished ETL transform node operates within the ETL pipeline, the specified insight mechanism can be invoked to populate the corresponding table configured to be populated by the distinguished ETL transform node, and such that, a language model is configured to access data stored in a table populated by an ETL transform node based on the natural language text description contained by the insight ontology object.

8. The one or more instances of computer-readable media of claim 7 wherein the distinguished ETL transform node further specifies as a trigger condition a modification to at least one of the distinguished ETL transform node's feeder tables.

9. The one or more instances of computer-readable media of claim 7 wherein the distinguished ETL transform node further specifies as a trigger condition an expiration of a designated refresh period.

10. The one or more instances of computer-readable media of claim 7 wherein the insight mechanism specified by the insight ETL transform node is a procedural analytical algorithm.

11. The one or more instances of computer-readable media of claim 7 wherein the insight mechanism specified by the insight ETL transform node is a prompt for invoking a generative model.

12. One or more instances of computer-readable media not constituting a signal per se, the one or more instance of computer-readable media collectively having contents configured to cause a computing system to perform a method, the method comprising:

processing an extract-transform-load ("ETL") pipeline configured to act on dynamic supply chain data for a subject organization available from one or more data sources, the ETL pipeline comprising a plurality of tables and one or more ETL transform nodes, one or more first tables each being populated from the one or more data sources, one or more second tables each being populated by an ETL transform node of the one or more ETL transform nodes based on content of one or more feeder tables of the ETL transform node;

as part of processing the ETL pipeline, triggering operation of an insight ETL transform node among the one or more ETL transform nodes, the insight ETL transform node identifying one or more of the plurality of tables as insight feeder tables, the insight ETL transform node specifying an insight mechanism; and in response to triggering operation of the insight ETL transform node, invoking the specified insight mechanism passing contents of the insight feeder tables to populate an insight results table among the plurality of tables, such that a language model is able to access the insight results table based on a natural language text description of an insight ontology object that references the insight results table and that is distinct from the properties of the insight results table.

13. The one or more instances of computer-readable media of claim 12, the method further comprising:

detecting at least one change to the insight feeder tables, and wherein the triggering is performed in response to the detecting.

14. The one or more instances of computer-readable media of claim 12, the method further comprising:

detecting expiration of a refresh period of time, and wherein the triggering is performed in response to the detecting.

15. The one or more instances of computer-readable media of claim 12, the method further comprising:

exposing the populated insight results table to a generative model to process a prompt concerning status of the subject organization's supply chain.

16. The one or more instances of computer-readable media of claim 15, the method further comprising:

receiving a prompt concerning dynamic supply chain data for the subject organization;

invoking the language model to process the prompt concerning dynamic supply chain data using a set of resources, the set of resources comprising an insight ontology object that references the insight results table and contains a natural language text description of the insight results table describing its contents and significance, and makes the insight results table available for access and use by the language model via the natural language description of the insight ontology object;

receiving a result from the language model; and causing the received result to be outputted.

* * * * *